United States Patent [19]

Gingell et al.

[11] Patent Number: 5,088,089
[45] Date of Patent: Feb. 11, 1992

[54] APPARATUS FOR PROGRAMMABLY ACCESSING AND ASSIGNING TIME SLOTS IN A TIME DIVISION MULTIPLEXED COMMUNICATION SYSTEM

[75] Inventors: Michael J. Gingell; Joseph E. Sutherland, both of Raleigh, N.C.

[73] Assignee: Alcatel NA Network Systems Corp., Raleigh, N.C.

[21] Appl. No.: 451,419

[22] Filed: Dec. 15, 1989

[51] Int. Cl.[5] .......................................... H04Q 11/04
[52] U.S. Cl. .................................... 370/67; 370/85.1
[58] Field of Search ................ 370/67, 85.1, 58.2, 370/68

[56] References Cited

U.S. PATENT DOCUMENTS 4,601,029 7/1986 Harprave et al. ................... 370/67
4,888,765 12/1989 Dyke ................................. 370/85.1

Primary Examiner—Douglas W. Olms
Assistant Examiner—Ghebretinsae Temesguen
Attorney, Agent, or Firm—Ware, Fressola, Van Der Sluys & Adolphson

[57] ABSTRACT

A three-ported apparatus is adapted to interface a serial TDM bus, a local controller and a line unit bus in a telecommunications terminal. All data passing between the TDM bus and the line unit bus is temporarily stored and is accessible to the local controller, allowing the controller to either pass said data without modification or provide modifications thereto. Signaling contained within the data may be translated to a form usable by the line unit through the use of translation tables downloaded from inventory storage on the line units. For each line unit, the local controller programmably controls time slot assignment, provisioning and inventory information access.

9 Claims, 7 Drawing Sheets

| SUB TIME SLOT | USE CONNECT BIT | RAM 64 TIME SLOT MEMORY | READ/ WRITE | RAM 80 CONNECT MEMORY SIG-XLATE/FIFO ETC. | READ/ WRITE |
|---|---|---|---|---|---|
| 00 | | LC Tx CONFIG | W | GET Rx CONNECT DATA | R |
| 01 | | LC Tx PCM | W | GET Tx CONNECT DATA | R |
| 02 | | LSP uP I/O | R/W | LSP uP I/O | R/W |
| 03 | SBIPCM | SBI Tx PCM | R | READ OLD Tx ABCD/HIT | R |
| 04 | | LC Rx CONFIG | R | READ OLD Rx ABCD 1,2 | R |
| 05 | | LC Rx PROVIS | R | READ OLD Rx ABCD 3,4 | R |
| 06 | | LSP uP I/O | R/W | LSP uP I/O | R/W |
| 07 | | SBI Rx PCM | W | WRITE NEW Tx ABCD/HIT | W |
| 08 | LCPCM | LC Rx PCM | R | ⌐ LOOKUP Tx SIG XLATE | R |
| 09 | | XLATED Tx SIG | W — ↓ | UPDATE FIFO (Tx) | W |
| 10 | | LSP uP I/O | R/W | LSP uP I/O | R/W |
| 11 | TSIPCM | Tx SBI PCM | R | ⌐ LOOKUP Rx SIG XLATE | R |
| 12 | | XLATED Rx SIG | W — ↓ | WRITE Rx ABCD 3,4 | W |
| 13 | LCSIG | LC Rx SIG | R | WRITE Rx ABCD 1,2 | W |
| 14 | | LSP uP I/O | R/W | LSP uP I/O | R/W |
| 15 | | LC Tx PROVIS | W | UPDATE FIFO (Rx) | W |

FIG.6

APPARATUS FOR PROGRAMMABLY ACCESSING AND ASSIGNING TIME SLOTS IN A TIME DIVISION MULTIPLEXED COMMUNICATION SYSTEM

BACKGROUND OF THE INVENTION

1. Field of the Invention

The present invention relates to time division multiplexed (TDM) communication systems and, more particularly, to an apparatus for programmably accessing and assigning time slots in a TDM communication system.

2. Description of the Prior Art

The Synchronous Optical Network (SONET) standard (American National Standards Institute Standard T1.105-1988 entitled "Digital Hierarchy Optical Interface Rates and Formats Specification") which is being adopted within the United States and elsewhere defines the standard for the transfer of information by means of optical fiber. According to the SONET standard, an optical carrier level (such as OC1, OC3, OC12 and OC48) signal is a signal that results from an optical conversion of a synchronous transport signal (STS) operating at the same transfer rate. An STS1 level signal is defined as the basic building block signal, with a high-speed transfer rate of 51.840 Mb/s, and is equated to an OC1 level optical signal. With high-speed transfer rates there is a need for multiplexing and demultiplexing information associated with lower-speed telephony standards to and from the high-speed transmission lines. Examples of such lower-speed standards include the digital signal standard, or DSX standard (where 'X' is an integer, such as 0, 1, 2 and 3). The DSX standard is commonly used in telephony with DS0 directed to subscriber level signals that operate at 64 Kb/s, DS1 directed to lines operating a 1.544 Mb/s, DS2 operating at 6.312 Mb/s, and DS3 operating at 44.736 Mb/s.

In order to access the high-speed transmission lines, network elements are required for transferring and grooming, i.e., segregating, subscriber information channels between the lower-speed transmission lines and the higher-speed transmission lines. These network elements may take on several different forms for providing transfer of information between various standard transmission rates. In order to take advantage of the wider bandwidth available on the high-speed lines for various applications such as data transfer, a means was required to combine DS0 channels to provide wider band facilities.

A family of access products has been developed by the Assignee of the present invention. These access products allow slower transmission lines to access the higher-speed optical transmission systems. These access products use an internal multi-link serial bus (SBI) operating at a rate of 4.096 Mb/s to transport information, signalling and processor commands. U.S. Patent application Ser. No. 351,458 filed May 12, 1989 and entitled "Serial Transport Frame Format Method" describes this unique serial bus and is incorporated herein by reference. Two access products are also described in the aforementioned patent application, said access products being a Terminal Multiplexer, adapted to interface a high-speed carrier with DS1 level transmission lines for reception and transmission of high-speed signals in one direction only. An Add/Drop Multiplexer (ADM) is also described in the aforementioned patent application and is designed to interface a high-speed carrier to DS1 level transmission lines for reception and transmission in each of two directions.

FIG. 1 illustrates the use of access products in a telephone transmission system. Two high-speed feeder lines 10 and 12 are shown as being at the optical OC1 level and the electrical STS1 level respectively. Both of these feeder lines operate at 51.84 Mb/s. An add/drop multiplexer 14, as described in the aforementioned copending patent application, connects either feeder line 10 or 12 to a DS1 level transmission line 16 operating at 1.544 Mb/s. In order to extract individual DS0 channels from the DS1 line, a separate network element 15 usually referred to as a DLC was required as an interface between the DS0 level and the DS1 level. In a commercial installation several DLCs would be used with each add/drop multiplexer. Thus, two separate network elements 14 and 15 were required in order for individual lines at the DS0 level to access an optical OC1 level transmission line, and in most cases several DLCs were used with one multiplexer.

The need for a DS1 level transmission line between the ADM 14 and the DLC 15 severely limited the control communications that could take place between the two network elements. The use of two separate network elements inherently reduced reliability, since all control information had to be conveyed over a single DS1 line. Control information in the form of signaling could be conveyed only to a limited extent using the robbed bit signaling technique and clear channel communication was not available. A means did not exist for the microprocessors in each element to communicate with each other unless a separate DS0 channel was dedicated to this purpose, removing the particular DS0 channel from the pool of DS0 channels available to carry subscriber traffic.

The DLCs are generally adapted to accept a plurality of line units servicing one or more DS0 channels each. The line units are connected to a TDM bus with the line signals being multiplexed onto the bus at specified time slots, each card having a predetermined time slot for inserting and extracting data from one of its channels. The line unit would be strobed to be activated during the time slot to which it is assigned. A plurality of back plane connections were required to provide a strobe signal to each line card. Thus, the system was limited to a pre-set number of line cards that could be handled by the system, and the assignment of the time slots to the line cards was fixed.

Control of the system was limited, since the system controller did not have access to the data contained within each time slot, including signaling information pertaining to the time slots.

With the advent of many different types of telecommunications service, various signaling schemes have been devised which are not compatible with each other. Signaling translation between equipment using one signaling scheme and equipment using another signaling scheme was required and the use of special signaling translation circuits for each different type of service had to be developed. Thus, the free interchange of line cards was restricted, due to the need to first provide for the required signaling translation.

Modern telecommunications systems must provide for high-speed wide bandwidth data communications facilities which cannot be serviced by individual DS0 level lines. Thus, higher speed DS1 lines had to be provided to handle individual customer requirements when they exceeded the capability of a DS0 line.

Thus, it was apparent that the flexibility demanded by modern telephone communications systems was not being efficiently handled by the prior art interfaces between high-speed feeder lines and DS0 level subscriber lines. There was clearly a need for a more efficient way of providing access to high-speed transmission lines by individual DS0 subscriber lines.

SUMMARY OF THE INVENTION

The present invention contemplates an apparatus for programmably accessing and assigning a time slot in a TDM system and, more particularly, to a circuit for interfacing DS0 line circuits with a TDM bus, such as the multi-link SBI described in the aforementioned U. S. Patent application Ser. No. 351,458.

U.S. Patent application Ser. No. 452,291, entitled "High-Speed Synchronous Transmission Line Access Terminal", filed on even date herewith, and assigned to the Assignee hereof, is hereby incorporated herein by reference. Said patent application describes a single network element which will interface a high-speed feeder transmission line 10 or 12, with a lower speed DS1 line 16 and DS0 subscriber lines 20, as shown in FIG. 1. The network element is an access terminal 22 having a core module 24 connected to either feeder line 10 or 12 and having ports connected to DS1 line 16 and to an access module 26 having ports connected to DS0 lines 20.

The access module 26 may comprise a plurality of individual line shelves, each of which may further accommodate a plurality of line cards for connection to individual subscriber lines. Each line shelf may accommodate up to 96 subscriber lines, with the core module 24 accommodating up to seven line shelves, for a total of 672 subscriber lines, each having access to an optical fiber carrier OC1 or an STS1 metallic feeder line.

The core module 24 is connected to the line shelves of the access module 26 by a plurality of SBIs, as disclosed in the aforementioned U.S. Patent application Ser. No. 351,458. The SBIs facilitate an embedded control technique for communicating control messages over channel 31, called the VI channel. This embedded control technique is described in U.S. Patent application Ser. No. 349,716 filed May 10, 1989, entitled "Embedded Control Technique for Distributed Control Systems", which is commonly assigned with this application and is incorporated herein by reference. The SBI using the VI channel allows the DS0 level signals to be tightly coupled to the high-speed OC1 or STS1 feeder lines. The technique allows for clear channel transmission by eliminating the need for the robbed bit technique and also provides for processor-to-processor communication between modules. The flexibility of the SBI arrangement facilitates signaling processing, provisioning and maintenance functions.

A pair of processors are provided in the core module, with one processor being redundant. Two processors are in each of the line shelves, each processor operating at about half capacity and capable of handling the other processor's load if it should fail. These processors are directly connected through the SBI to provide extensive processor-to-processor communication between the core and the line shelves. A second redundant SBI is also provided, thereby greatly enhancing the overall reliability of the system by not relying on a single DS1 line for element-to-element communication.

The use of processors in both the core and in the line shelves provides a host of advantages which will become apparent. One advantage is the unique flexibility provided in grooming DS0 channels and the ability to combine them to provide wider bandwidth capability to service future communications needs such as ISDN. Another advantage of using a line shelf processor (LSP) lies in its adaptability to future enhancements and reconfigurations by merely effecting a software change.

The heart of the line shelf is a line shelf access unit (LSA) which interfaces the line units (LUs) and the SBIs. Each LSA includes a pair of time slot access devices (TSAs) which function to collect and distribute pulse code modulated (PCM) signals, signaling, provisioning and configuration data between the SBIs, the LUs and the LSPs. A unique feature of the TSA is that it provides the LSPs with direct access to the data contained within a particular time slot to allow the LSPs to monitor and alter the data. This data may contain speech information, signaling and other control information, thereby providing the LSPs with heretofore unavailable control capabilities.

The TSA also facilitates a time slot assignment feature which is controlled by the LSP to provide assignment of any particular time slot to any subscriber line on any LU, or a plurality of time slots to a single subscriber line to provide broad band capability.

The TSA also provides for signaling translation between the signaling scheme used in the particular LUs and the signaling scheme used for signals received on the SBI. The signaling translation function is accomplished via a downloadable translation table, which is written into RAM contained in the TSA unit by the LSP.

A primary objective of the present invention is to provide the LSP access to the data contained in individual time slots so that the LSP can monitor and alter the data.

Another objective of the present invention is to provide for signaling translation between the signaling schemes used by the network elements interfaced by the TSA.

Another objective of the present invention is to provide signaling translation capability that is automatically updated when a LU is changed.

Another objective of the present invention is to provide programmable time slot assignment so that any LU may be assigned to any time slot.

Another objective of the present invention is to provide the assignment of multiple time slots to an LU, thereby providing broad band service for a subscriber connected to the LU.

DESCRIPTION OF THE DRAWINGS

FIG. 6 is a RAM access timing diagram for the RAMs used in the present invention.

DETAILED DESCRIPTION OF THE PRESENT INVENTION

Figure 2:
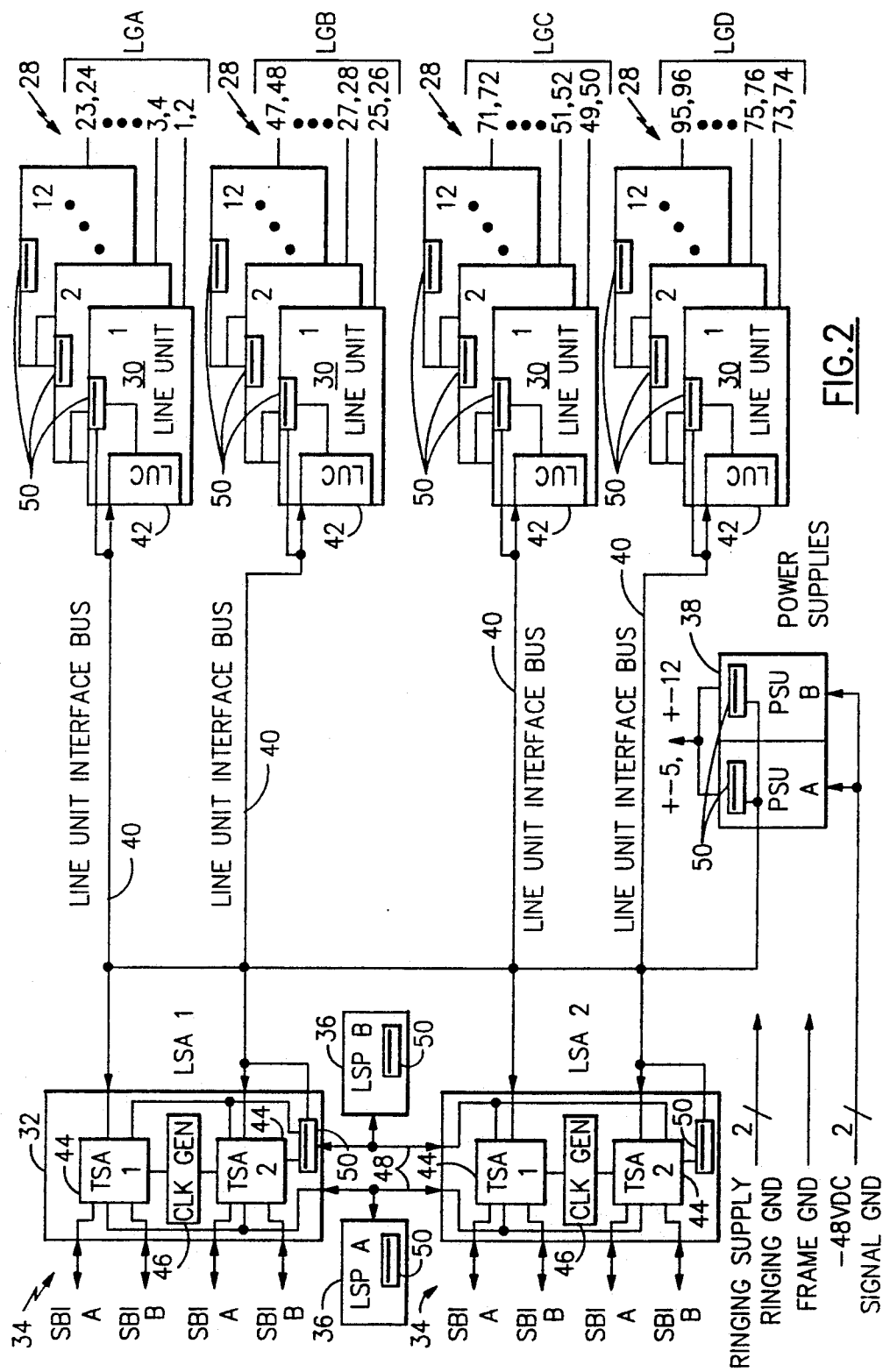
FIG. 2 is a block diagram of a line shelf in which the present invention is used.

Referring to FIG. 2, there is shown a block diagram of a line shelf used in the access module 26. Each line shelf is arranged with four groups 28 of subscriber line outputs at the DS0 level. Each of the groups includes 12 line units (LUs) 30, most units are capable of handling two subscriber lines so that a total of 96 subscriber lines may be handled by a line shelf. A pair of line shelf access units (LSAs) 32 are arranged to each service two of the groups 28 of subscriber lines and function to multiplex the DS0 channels of these groups to a pair of serial interface buses (SBIs) 34, one of which is redundant. Two line shelf processors (LSPs) 36 are provided to control the LSAs 32, with each processor having sufficient capacity to control the entire line shelf in the event of failure of the other processor. Thus, in normal operation both processors work at less than full capacity. In the event of a failure, one processor can service the line shelf with only slightly degraded service. Two power supplies 38 are also provided, with one being redundant.

The LSAs 32 are connected to the various LUs 30 via line unit interface buses 40. The line unit interface buses 40 interface with a line unit controller (LUC) 42 provided in each of the LUs 30. The LUCs 42 perform all the functions necessary to access the line unit interface buses 40 with the LUs 30. The operation of the LUC is more fully described in U.S. Patent application Ser. No. 451,436 filed on even date herewith and entitled, "Line Unit Interface Circuit", which application is incorporated herein by reference and is commonly assigned with the present invention.

The LUs 30 are plugged into slots in the line shelf, which includes connectors to the line unit interface bus 40. The connectors have five pins that are selectively strapped to provide a five-digit identification code for the slot and the plugged-in LU. The LSP periodically scans the various card positions and can detect when a card is plugged into an identified slot.

EEPROMs 50 are provided on each of the pluggable card units, such as the LUs, LSAs, LSPs and power supplies. The EEPROMs 50 provide storage for identification and inventory information about each card and other programmable data relating to the circuitry on each card.

The LSAs 32 each include two time slot access circuits (TSAs) 44 and a clock generator 46. The TSAs 44 are connected to each LSP 36 via LSP buses 48 and perform most of the functions of the LSAs 32.

The TSA 44 performs the following functions in the access terminal 22: reception and transmission of SBI signals; detection and generation of UNICODE (Universal trunk out of service code established by Bell System specifications) and performance of required tasks associated with UNICODE; collection of PCM digital information from the LUs and the LSPs; distribution of PCM information to LUs and the LSPs; generation of control information to indicate to the LUs which subscriber channel time slot is available on the various line unit interface buses 40; translation of signaling information between the SBIs and the LUs by utilization of RAM-based translation tables provisioned by the LSP; LSP access in both read and write modes to all memory and control registers on the TSA, including access to the time slots of the line unit interface bus and the SBI; reception and transmission of inter-module messages on the VI channel; control of EEPROMs on each plug-in unit; and the provision of storage for information to be transmitted to and received from the various elements connected to the TSA.

Figure 1:
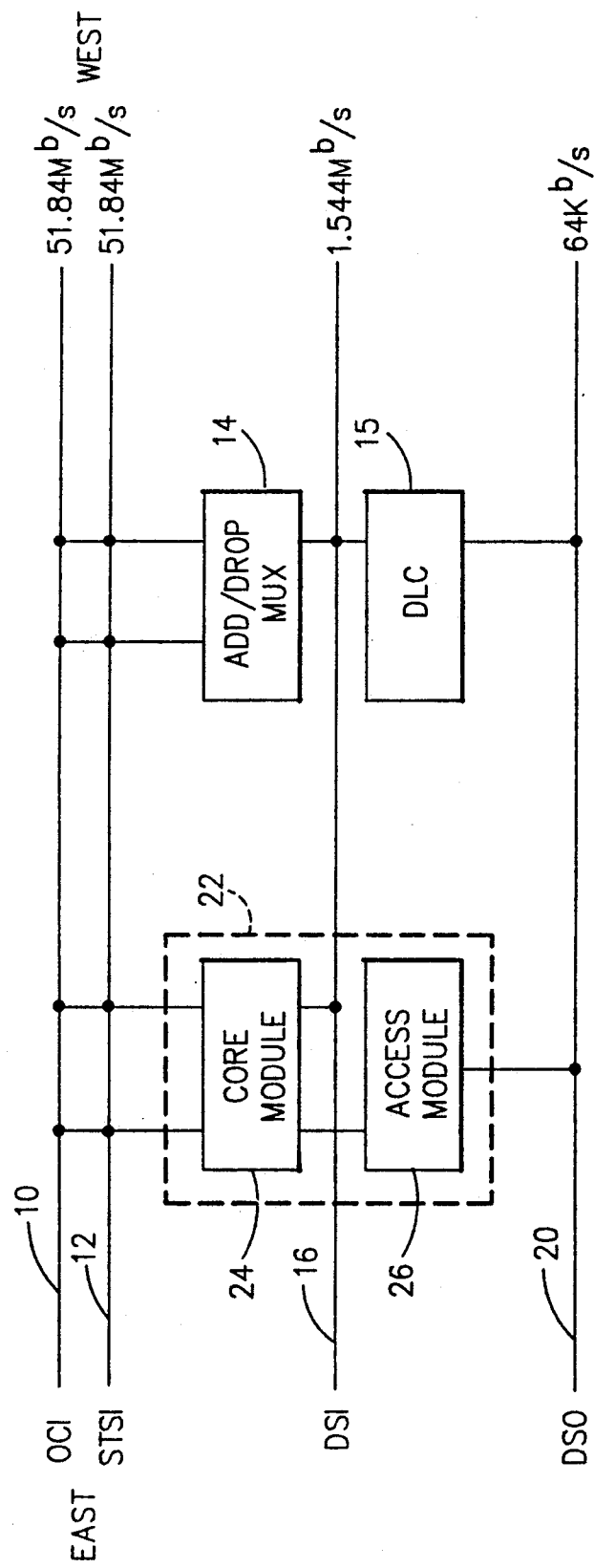
FIG. 1 is a block diagram illustrating the environment in which the present invention is used as compared to that of the prior art.
Figure 3:
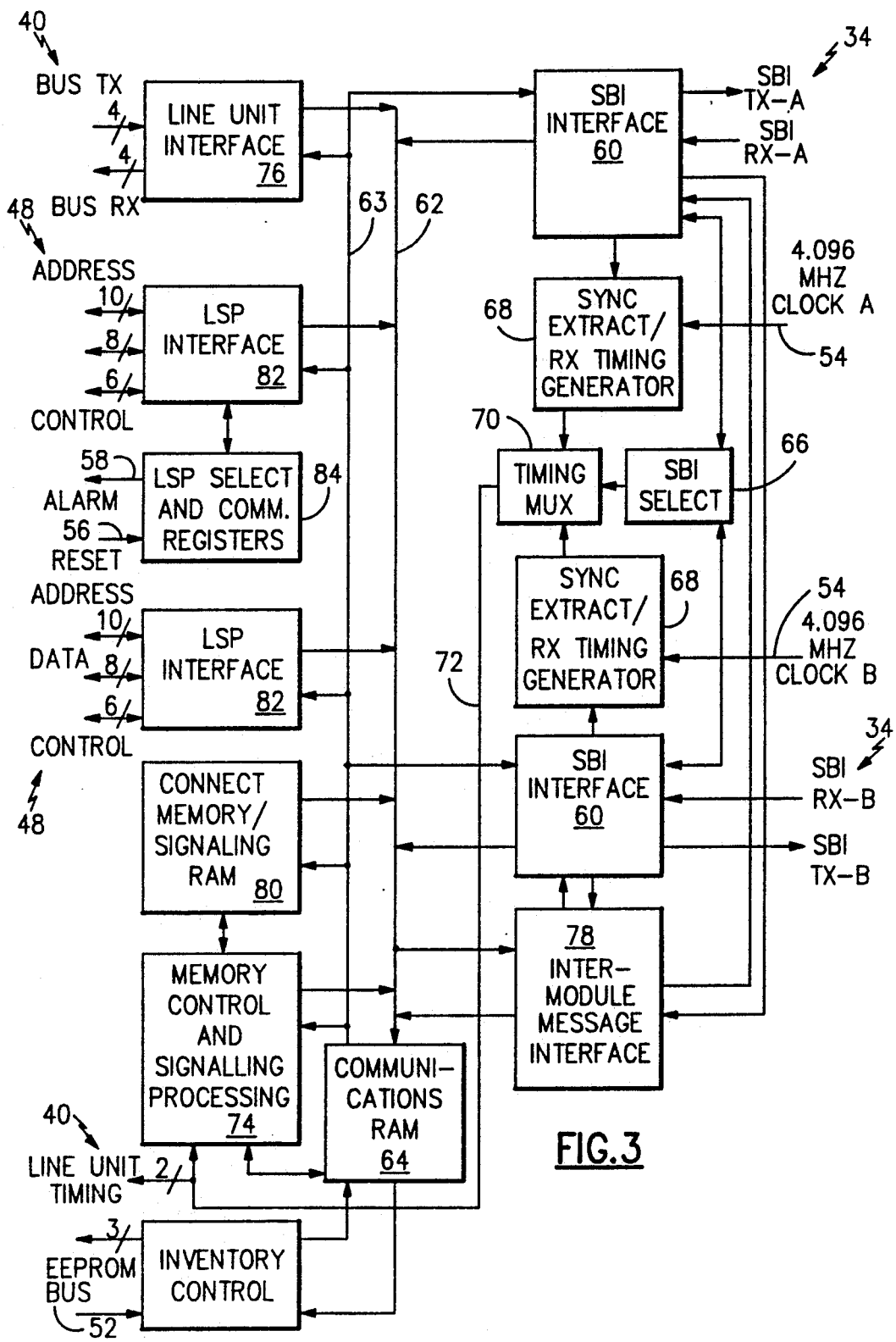
FIG. 3 is a block diagram of the present invention.

Referring to FIG. 3, there is shown a block diagram of the TSA 44. The TSA 44 as shown provides the logic necessary to interface the SBIs 34, which provide internal connection to the core module 24 shown in FIG. 1, the line unit interface bus 40 and the LSP buses 48.

The SBIs 34 provide for the receipt and transmission of 32 channels of 16-bit serial data at a rate of 4.096 Mb/s arranged in a format to conform to that set forth in the afore-mentioned U.S. Patent application Ser. No. 351,458. Two 4.096 MHz clocks derived from each of the SBIs 34 are provided on lines 54.

The line unit bus 40 provides for the transmission and reception of information contained in 32 time slots each having 8 bits for a data rate of 2.048 Mb/s. Bus 40 has four lines in each direction for the transmission and reception of PCM information, signaling data, provisioning data and configuration data. The line unit bus 40 also includes two lines for providing line unit clock signals, one signal being 2.048 MHz to drive the line circuit codecs and data input and output circuits, with the other clock being at the rate of 256 KHz for use by the LUCs.

The EEPROM bus 52 provides for the transmission and reception of data to and from the EEPROMs at a data rate of 256 Kb/s. Additionally, the EEPROM bus provides various strobes for EEPROMS used on the power supplies and the LSAs 32.

The LSP buses 48 comprise a plurality of lines for providing addresses, data and control information between the TSA and the LSPs 36. The address lines provide address inputs to select data in storage in the TSA, while also providing a chip enable signal. Read and write enable signals are provided, along with acknowledgement signals, interrupt signals, sanity timer inputs and DMA requests to the LSPs.

A power-on reset signal is provided on line 56, and an LSA failure alarm is outputted on line 58.

An SBI interface 60 is provided for each of the SBIs 34 and is adapted to received information in serial format in 32 time slots, each of 16 bits, at a rate of 4.096 Mb/s. The interface 60 reconstitutes the information into normal bipolar format, and the information is then fed to serial-to-parallel registers, where each complete 16-bit word, including both speech and signaling, is captured and directed to the correct location in the TSA via an internal RX bus 62. The speech portion of the information is loaded directly into a selected address in a communications RAM 64, while signaling data is translated via a look-up table in a connect memory/signaling RAM 80, which will be discussed subsequently, before being stored in RAM 64. Information to be transmitted on the SBI is transmitted from a 16-bit serial shift register in SBI interface 60, which is loaded from RAM 64 via an internal TX bus 63. The transmitted information consists of speech and signaling, plus timing information and parity.

The TSA normally operates off of SBI A but can switch to redundant SBI B if A fails or control information provided in time slot 0 of the SBI signal commands a change. The unused SBI continues to run in standby mode, carrying only sync, parity and loopback data. An SBI select circuit 66 obtains control information from time slot 0 of the SBI and senses bits 8 and 9 which contain AB control bits. The AB bits are used to set a selection latch to determine which of the two available SBI bit streams is to be used. Control information from both SBIs must agree and must persist for two frames for a changeover to occur. In the event of failure, loss of sync or clock, the TSA is designed to switch automatically to use the other SBI if the AB bits in that SBI also agree that the change should take place.

The serial bit stream received from the SBI uses a Manchester-type transmission code, which embeds the clock signal within the bit stream. The coding scheme provides for a rising edge at the beginning of each data bit. Using this scheme, the 4.096 MHz clock may be extracted from the receive SBI signal. This extraction takes place on the LSAs 32 within the clock generation circuitry 46 of each LSA. The regenerated clocks are applied at lines 54, and the Manchester-coded information is applied to the SBI interfaces 60.

A sync extraction and receive timing generator circuit 68 receives data from the SBI interface 60 and also receives the 4.096 MHz clock from line 54. The 4.096 MHz clock is divided to provide frame, word and bit clock signal required for the TSA. These clocks must be synchronized to the active incoming SBI bit stream, since they drive address control logic that determines the address for writing received information into RAM 64. Due to the critical nature of this circuit, both timing generators 68 remain active and synchronized to their respective SBIs.

An independent frame, word and bit clock and counter circuit synchronizes the timing of all operations in the transmit direction. These clocks and counters provide the addressed to RAM 64 for all SBI transmit-related read/write operations. The SBI A and B transmit circuits have independent timing and run asynchronously.

The SBI is synchronized by a unique framing pattern provided in time slot 0, which pattern uses bits 1–7 and is chosen to be 0100111 for an even frame. This pattern is alternated on even and odd frames with its complement, to prevent accidental framing on a repeated steady state pattern.

The synchronization algorithm is similar to the CCITT standard for 32 time slot TDM, and can be represented by a 6-state machine, as described in Table I.

TABLE I

| Current State | Detector Condition | Next State | Other Action |
|---|---|---|---|
| A Out of sync | Found sync word | B | Start frame counter |
| | Lost sync word | A | Set alarm flag |
| B Found sync word | Found sync word | C | Reset alarm flag |
| | Lose sync word | A | Restart search |
| C In sync | Found sync word | C | |
| | Lost sync word | D | |
| D Lost 1st sync | Found sync word | C | |
| | Lost sync word | E | |
| E Lost 2 syncs | Found sync word | C | |
| | Lost sync word | F | |
| F Lost 3 syncs | Found sync word | C | |
| | Lost sync word | A | Set alarm flag |

While in state A, representing out of sync, the transition from state to state is at a 4.096 MHz rate. When a possibly valid sync word is detected, the frame counter is reset to 0. After 125 microseconds, the counter indicates that the start of a new frame has been reached, and the state of the bits in time slot 0 is checked against the expected sync word, and the state machine steps to the next state, as indicated by Table I.

The properly synchronized timing signals generated by the receive timing generator 68 are provided to a timing multiplexer 70, which receives an output from the SBI select circuit 66 to select the appropriate timing signals which are synchronized to the active SBI. The timing signals are provided by line 72 to the line unit bus 40 for line card timing purposes and to a memory control and signal processing circuit 74.

A LU interface 76 is provided to interface the line unit bus 40 with the internal RX and TX buses 62 and 63. The LU interface circuitry merely comprises a plurality of shift registers including parallel-to-serial registers, timed to read out data to the line units, and serial-to-parallel registers for receiving data from the line units.

An intermodule message interface 78 is connected to both SBI interfaces 60 for receiving channel 31 data therefrom. The intermodule message interface 78 is also connected to the RX and TX internal buses 62 and 63 for conveying messages to the various TSA components. Channel 31 on the SBI is known as the VI channel, which facilitates the embedded control technique described in the afore-mentioned U.S. Patent application Ser. No. 349,716. The VI channel is used to communicate control messages within the access terminal 22.

There are two LSP interfaces 82 for access to the TSA. Each is identical and connects to an 8-bit bidirectional data bus, a 9-bit address bus, and control and status lines. Each LSP provides a processor good 'Sanity' signal which is used by arbitration logic on the TSA to determine which bus to use.

A LSP selector 84 ensures that only one LSP is enabled at any given time. Arbitration logic in the TSA chip determines which LSP has access to the TSA RAM and registers. If an LSP is denied access by the arbitration process, it can still read and write to interprocessor communications registers located in LSP selector 84 to talk to the other LSP. All other addresses will return a zero value byte.

Figure 4:
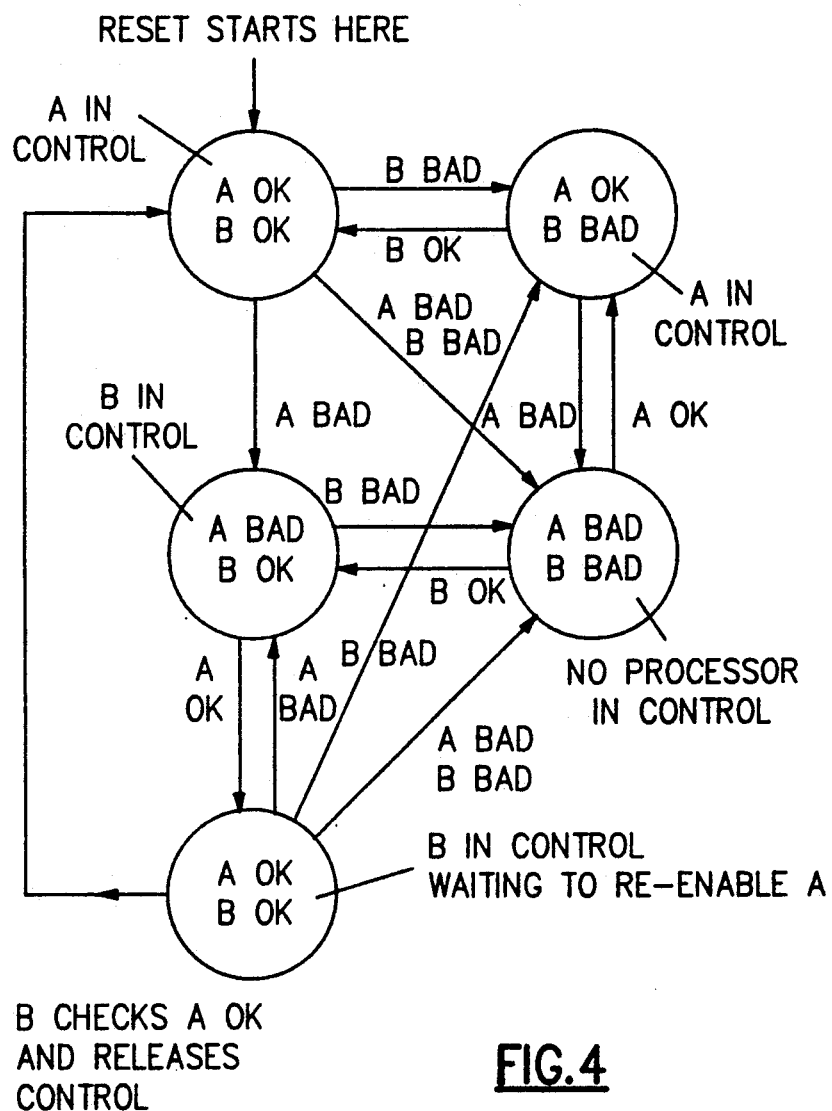
FIG. 4 is a state diagram.

The arbitration logic is based on the sanity signals from the LSPs and an arbitration state machine. FIG. 4 shows the state machine logic. If both LSPs are sane, the TSA defaults to its primary LSP bus. Once the primary LSP is deemed to have failed, it can only be restored by the sanity being restored and the secondary LSP relinquishing control by writing to address 1B9 as seen by the LSP.

Arbitration can be over-ridden by a message from a network control processor, which forces the active LSP to temporarily indicate that it is no longer good.

Figure 5:
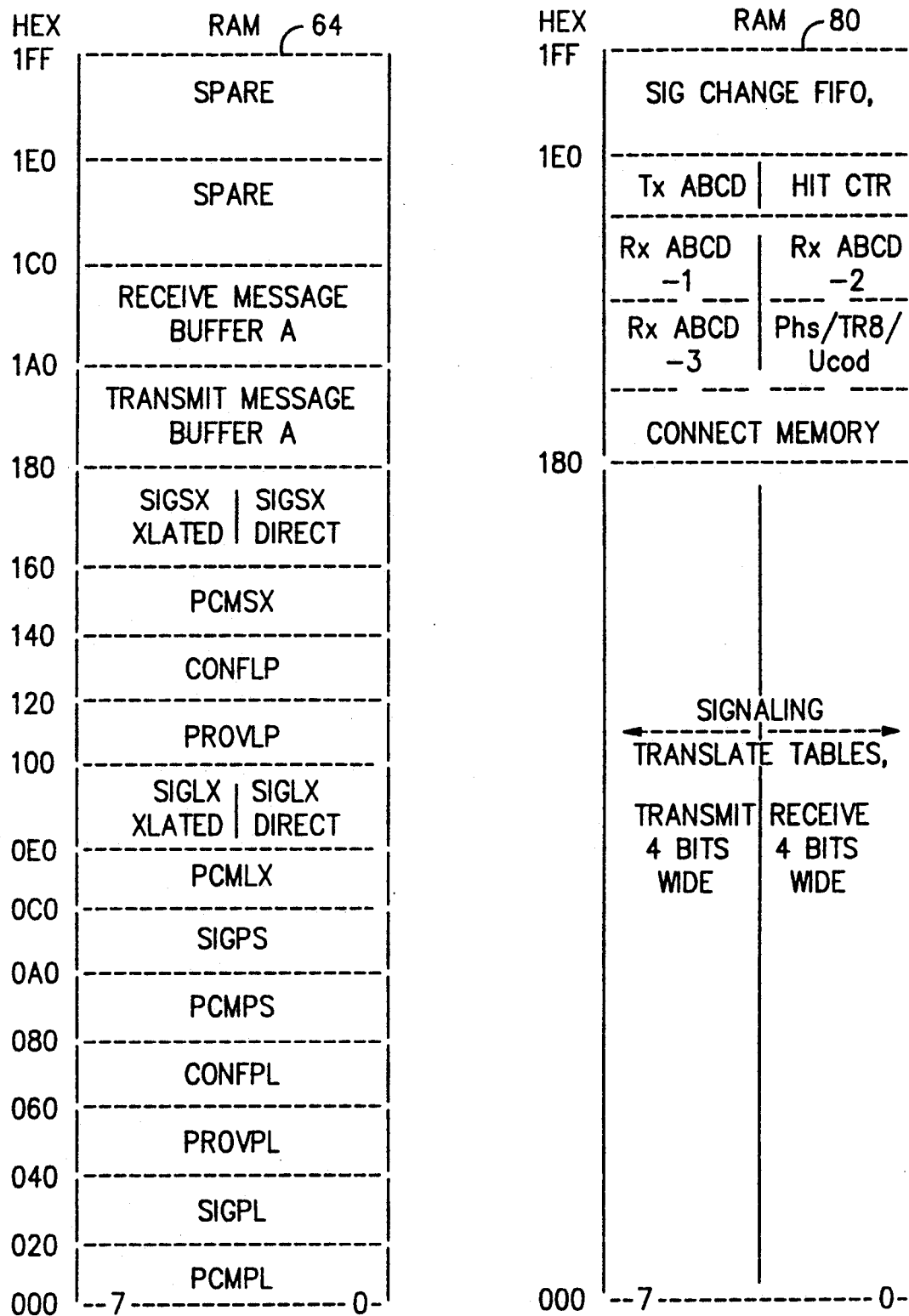
FIG. 5 is a memory map of two RAMs used in the present invention.

The TSA is provided with two 512-byte RAMs 64 and 80. A portion of RAM 64 is designated the communications RAM and is used to store data that is being communicated between the SBI 34, the line unit bus 40 and the LSP bus 48. RAM 80 is designated the connect memory and signaling RAM and provides storage for various channel control bits, signaling translation lookup tables, and signaling memory and change information. FIG. 5 shows a memory map for the two RAMs 64 and 80, which are organized as two side-by-side 512×4-bit RAMs, so that it is possible to write to one nibble of a signaling byte without disturbing the other nibble. The addresses for the RAMs are given in HEX, as are all other addresses mentioned herein, unless specified to be otherwise.

Access to the RAMs is time-division multiplexed on internal buses 62 and 63, so that effectively each RAM is multiported, so that the SBI 34 and line unit bus 40 may both be read from and written to simultaneously. In addition, the LSP may request a read or write of any location. Each 3.9 usec channel time is divided into 16 sub-slots representing a 16-bit word. Four of such bits are allocated to the LSP. The LSP therefore sees the TSA as a slow memory with an access time of 1-2 usec. When the LSP requests a read or write, the TSA activates a cycle which waits for the next available LSP access slot. The read or write takes place, and the TSA pulses an acknowledge line low for 0.25 usec to tell the LSP to proceed. The LSP must have built-in fail-safe protection in the event of a missing LSA or a bad TSA failing to return an acknowledge.

The communications RAM is actually a 384×8 section of RAM 64 which provides storage for all data, including PCM information samples, signaling samples, provisioning data and configuration codes. The communications RAM is mapped directly to the LSP's memory space and is allocated such that it provides 12 bytes of storage for each of the 32 SBI channels associated with a 24-channel line shelf group. The data is mapped as 12 blocks of 32 bytes each, one block per data type, with the 32 bytes each representing an SBI time slot. The communications RAM provides the major part of the interfacing between the various buses within the line shelf, as the communications between the buses is accomplished via designated time slots in the communications RAM.

The TSA is synchronous and runs on a fixed cycle, repeating frames every 125 usec. The frames are divided into 32 equal channel time slots, each of which is 16 clock cycles long. Access to the RAMs is controlled by the memory control and signaling processing circuit 74, which receives timing signals on line 72 from the timing multiplexer 70. Each clock cycle corresponds to a sub-time slot when a read or write function is performed.

FIG. 6 is a timing diagram illustrating the allocation of each sub-time slot for reading or writing the various functions. The actions that must be synchronized with the reads and writes in RAM 80 are also shown.

During a write operation, the sources include: four serial bit streams from the line unit bus 40, identified as PCMT-PCM transmit bus, SIGT-signaling TX bus, PROT-provisioning bus, and CONT-configuration bus; a serial bit stream from the selected receive SBI; and an LSP bus 48. During a read operation, the destinations include: four serial bit streams on line unit bus 40, including PCMR-PCM bus, SIGR-signaling bus, PROR-provisioning bus, and CONR-configuration bus; a serial bit stream to the selected transmit SBI 34; and an LSP 48.

The communications RAM appears to the processor to be divided into two sections. One is used by the LSP to store information, while the other is used by the LUs and the SBI to store information. The LSP's section can be written and read by the LSP and is divided into six 32-byte blocks.

The LSP's section of RAM 64 stores the following information, as shown in FIG. 5: PCMPL-PCM data written by the LSP that can be sent to the LU each frame if the connect bit LCPCM =0; SIGPL-signaling data written by the LSP that can be sent to the LU each frame if the connect bit LCSIG =0; PROVPL-provisioning data written by the LSP that is sent to the LU each frame; CONFPL-configuration data written by the LSP that is sent to the LU each frame (This data will be initialized to send ID codes to activate LUCs on LUs having the ID code that is sent. The TSA sends a special code in time slot 30 to indicate an offset between transmit and receive frame timing. The receive timing is transmitted along with an offset value for the transmit timing); PCMPS-PCM data written by the LSP that can be sent to the SBI each frame if connect bit SBIPCM =0; and SIGPS-signaling data written by the LSP that can be sent to the SBI each frame if connect bit SBISIG =0.

The LU and SBI section of RAM 64 is written by the LU and the SBI and with the exception of SIGSX should normally only be monitored by the LSP. This section is also divided into six 32-byte blocks as follows: PCMLX-PCM data written by the LU and sent to the SBI each frame if a connect bit SBIPCM =1; SIGLX-the least significant four bits of translated signaling data bits 0-3 from the LU sent to the SBI each frame is connect bit SBISIG =1, and the most significant four bits, being untranslated signal data bits 4-7 from the LU, are not sent to the SBI, but all 8 bits can be read by the LSP; PROVLP-provisioning data written by the LU each frame; CONFLP-configuration data indicating the LU type codes written by the LU each frame; PCMSX-PCM data written by the SBI and send to the LU each frame if the connect bit LCPCM =1; and SIGSX-the least significant four bits being ABCD signaling data from the SBI, translated by the receive signaling look-up table, and the most significant four bits are sent independently by the LSP writing to this address without affecting the SBI ABCD data (All eight bits are sent to the LU each frame if connect bit LCSIG =1).

RAM 64 includes 64 bytes which are split into two sections of 32 bytes each to store, receive and transmit VI channel messages from the selected SBI. These messages are extracted by the intermodule message interface 78 from time slot 31 on the SBI and are automatically written into the correct location of the receive message buffer at 1A0 through 1BF of RAM 64. The specific address is determined by an offset number contained in bits 10-14 of the VI channel 31.

The outgoing SBI messages are stored in a transmit message buffer at 180 through 19F of RAM 64. The message transmission is enabled by bit 4 located in control register 1, which will be discussed subsequently. Two additional registers control the movement of outgoing messages. These registers are the send message start pointer and the send message end pointer. When transmission is enabled, successive bytes are read from the appropriate buffer using the sent message start pointer as the index. The bytes are inserted in time slot 31, the VI channel, bits 1-7 together with the index count in bits 10-14, and the VI bits 8 and 9 are set to 01, indicating a valid message and no interrupt. When the index counter contents equal that of the terminal count, then the VI bits are set to 00, indicating a valid message, interrupt. On subsequent frames, bits 8-14 are set to 1100000, which is a non-looped idle code.

RAM 80 includes a connect memory which is a 24-byte section located at 180-197 and provides storage for various channel control bits. The 24 bytes are for the 24 valid speech time slots of SBI 34 only. Each byte has eight control bits which define attributes for the channel to which the byte is assigned. The connect memory can be read and written by the LSP via a page mode access to be discussed subsequently.

The definition of each of the channel attribute control bits is as follows:

SBIPCM (Bit 0): controls whether PCM data toward the SBI comes from PCMLX (SBIPCM =1) or from PCMPS (SBIPCM =0).

SBISIG (Bit 1): controls whether signaling data toward the SBI comes from SIGLX (SBISIG =1) or from SIGPS (SBISIG =0).

LCPCM (Bit 2): controls whether PCM data toward the LU comes from PCMSX (LCPCM =1) or from PCMPL (LCPCM =0).

LCSIG (Bit 3): controls whether signaling data toward the LU comes from SIGSX (LCSIG =1) or from SIGPL (LCSIG =).

SIGMD0 (Bit 4) and SIGMDI (Bit 5): these two bits are used together to define the signaling mode of the channel as A-type, AB-type, ABCD-type, or a special ABCD-type which is updated every 125 Usec.

| SIGDM1 | SIGDM0 | Channel Mode |
|---|---|---|
| 0 | 0 | A type signaling |
| 0 | 1 | AB type signaling |
| 1 | 0 | ABCD type signaling |
| 1 | 1 | Special through channel |

A through channel passes signalling without translation and provides 56Kbits/s throughput.

CHNG (Bit 6): controls whether information about changes in the signaling data are to be stored in a signaling change FIFO chip for attention by the LSP. 1=yes watch this channel for changes.

CHLPBK (Bit 7): controls a per-channel loopback option which causes received PCM data to be inverted and looped back out on the transmit SBI in the same channel. Data is inverted for use with the TR8 Mode 2 applications. Signaling is not affected. 1 =loopback.

Channels 0–3 and 28–31 are assigned fixed (non-programmable) connect bits as follows:

| Bit | 7 | 6 | 5 | 4 | 3 | 2 | 1 | 0 |
|---|---|---|---|---|---|---|---|---|
| Channels 0–3: | 0 | 0 | 0 | 0 | 0 | 0 | 0 | 0 |
| Channels 28–30: | 0 | 0 | 1 | 1 | 1 | 1 | 1 | 1 |
| Channel 31: | 0 | 0 | 0 | 0 | 0 | 0 | 0 | 0 |

Channels 28–30 are transparent and allow data, both PCM and signaling directly through in both directions at all times.

Two 384×4 sections of RAM 80 are designated for storage of signaling translation tables for translation of signaling information between the SBI and the LUs. The signaling translation tables are actually two look-up tables, one for receive and one for transmit, which are preloaded by the LSP, thereby allowing signaling translation to be performed without constant intervention from the LSP. The translation tables include the necessary information for translating signaling for each of the LUs. When an LU is inserted into the line shelf, the LSP immediately identifies the LU address as a particular slot in the line shelf in which the LU is inserted. The LSP then reads from the EEPROMs 50 on the LU signaling translation information, stored therein, for the translation required for the particular signaling scheme used by the LU. The LSP then writes the translation information into the signaling translation tables in RAM 80.

ABCD signaling information received from the SBI in bits 8–11 is pre-processed and then combined with the channel number to form an index into the receive translate table. The 4-bit data at this address is the decoded signaling information which is read and then written to the appropriate SIGSX low nibble in the communications RAM 64.

Signaling data from the LU detectors is pre-processed and combined with the slot number of the line shelf to form an index into the transmit translate table. The 4-bit data at this address is the coded ABCD signaling information which is read and then written to bits 4–7 of the appropriate SIGLX address in RAM 64. At the same time, multiframe phase bits are stored in bits 2 and 3. When the appropriate time comes for this channel to be transmitted on the SBI, this data will be read out into the signaling byte as SBI bits 8–14, combining it with the speech byte and adding parity bit 15.

The absolute address of any given channel translate table is at 16×(channel −1) in RAM 80, where the channels are number from 1–24. Each channel uses 16 bytes, with each byte being split into two nibbles, the high nibble being the transmit and the low being the receive translate data.

A 32-byte section of RAM 80 located at 1E0 to 1FF is reserved for use as a FIFO, which indicates which signaling channels have recently changed state. The TSA maintains a register which points to the next free RAM location. Each time data is pushed or popped from the FIFO, this pointer is incremented or decremented automatically unless an end-stop is reached. The LSP pops data from the FIFO by reading at address 1A4. Flags in a status register 2, to be described subsequently, indicate whether the FIFO is empty or full.

The signaling state of each channel is sampled every 6, 12 or 24 frames, depending on whether it is an A, AB or ABCD type signaling, as indicated by connect bits SIGDM0 and SIGDM1. At this time the signaling is translated in RAM 80 and put into the appropriate location in RAM 64, such as SIGSX or SIGLX for outward transmission. At the same time, the signaling state is compared to the previous state, and if a change has occurred, this information is pushed as a byte of information onto the FIFO stack. The LSP can then read this information.

The FIFO is read by the LSP at an address 1A4 of a register contained within the LSP interface 82. This address returns the byte pointed to by the FIFO pointer, which is then decremented. The pointer stops at 00 or IF. The status of the FIFO is given by bits 0 and 1 of a status register 1. Bit 0 =1 if the FIFO is empty, and bit 1 =1 if the FIFO is full. Continuing to read when the FIFO is empty will return the data at FIFO location 00. The format of the data pushed onto the FIFO is:

| Bit | | | | | | | |
|---|---|---|---|---|---|---|---|
| 7 | 6 | 5 | 4 | 3 | 2 | 1 | 0 |
| U | Tx | Rx | (-----Channel Number-----) | | | | |

Bits 0–4 indicate which channel changed
Bit 5 indicates if Receive Channel changed
Bit 6 indicates if Transmit channel changed
Bit 7 indicates if UNICODE was detected A 24-byte portion of RAM 80 at 1C8-1DF is allocated to hold data about the state of transmit signaling from the LU. The most significant 4 bits hold the four untranslated signaling bits from the line card. The least significant 4 bits are used as a hit timer to filter relay bounce noise that could generate a false off-hook signaling bit A.

The format of the transmit signaling data from an LU in RAM 80 is:

At address IC8 +(channel −1):

| Bit | | | | | | | |
|---|---|---|---|---|---|---|---|
| 7 | 6 | 5 | 4 | 3 | 2 | 1 | 0 |
| A | B | C | D | H3 | H2 | H1 | H0 |

ABCD are the four untranslated signaling bits from the LU. A is the off-hook bit, 1 = on-hook (break). H3 to H0 forms the hit timer counting in 3 ms steps for ABCD signaling. The hit timer acts only on the A bit and can be disabled by overwriting its value with all 1 s.

The receive direction is handled by a 48-byte section of RAM 80 at 198–1C7. This holds the last three complete received valid ABCD samples for each of the 24 channels 1–24. The most recent is used for comparison for change of state detection. All four are used for UNICODE detection.

Channels can be provisioned individually to receive signaling in straight ABCD format or toggling (TR8) format.

In TR303 mode (toggling bit detection disabled) the format of received data stored in RAM 80 is:

At address 1B0 +(channel −1):

| Bit | | | | | | | |
|---|---|---|---|---|---|---|---|
| 7 | 6 | 5 | 4 | 3 | 2 | 1 | 0 |
| A1 | B1 | C1 | D1 | A2 | B2 | C2 | D2 |

At address 198 +(channel −1):

| Bit | | | | | | | |
|---|---|---|---|---|---|---|---|
| 7 | 6 | 5 | 4 | 3 | 2 | 1 | 0 |
| A3 | B3 | C3 | D3 | MFS | 0 | U1 | U0 | where
A1-D1 are the most recent received ABCD.
A2-D2 are the previous received ABCD.
A3-D3 are the oldest received ABCD.

MFS is the Multiframe Sync bit MFS1 (SBI bit 12) received along with A1-D1.
Bit 2 is user set to 0 to select this mode.
U1-0 forms a 2-bit counter for UNICODE.

In TR8 mode (toggling bit detection enabled) the format of received data stored in RAM 80 is:

At address 1B0 +(channel −1):

| Bit | | | | | | | |
|---|---|---|---|---|---|---|---|
| 7 | 6 | 5 | 4 | 3 | 2 | 1 | 0 |
| A1 | B1 | A2 | B2 | A3 | B3 | A4 | B4 |

At address 198 +(channel 3'1):

| Bit | | | | | | | |
|---|---|---|---|---|---|---|---|
| 7 | 6 | 5 | 4 | 3 | 2 | 1 | 0 |
| A | At | B | Bt | MFS | 1 | U1 | U0 | where
A1, B1, A2, B2 are the latest received ABCD bits.
A3, B3, A4, B4 are the oldest received ABCD bits.
A, At, B, Bt is the result of the toggle-to-untoggle conversion made when A1-B2 were first received.
A and B are the state of the AB bits and At and Bt indicate if they are toggling.
MFS is the Multiframe Sync bit MFS1 (SBI bit 12) received along with A1-D1.
Bit 2 is user set to 1 to select this mode.
U1-0 forms a 2-bit counter for UNICODE.

If the FIFO update provisioning bit is set in the connect bit memory, then the FIFO will be updated if the logic determines that a valid change has taken place in the signaling. Bits 0 and 1 of status register 2 at address 1A1 in the LSP interface indicate if the FIFO is empty or full respectively.

The FIFO pointer can be reset to 0 by setting bit 5 of address 1AE to a 1 and then resetting it.

In the transmit direction the FIFO is updated if the incoming ABCD is different from the previously-stored ABCD. A change in the A bit will only cause an update after the hit time has expired if the hit timer is enabled.

In the receive direction, the incoming ABCD must be different from the old ABCD for two successive times for the FIFO to be updated in TR303 mode. If toggling TR8 type signaling is selected, then the logic uses the incoming ABCD with A1 to B4 to create a new A, At, B, Bt. This is compared to the previously-stored A, At, B, Bt and, if different, the FIFO is updated.

To control all the functions of the TSA and to detect various operational states, numerous control and status registers are provided as shown in Table 2.

TABLE II

| Register Name | Register Function | LSP Read/ Write | Address (HEX) |
|---|---|---|---|
| Control Register 0 | | | 1A0 |
| Bit 0 | DMA phase 1 enable | W | |
| Bit 1 | DMA phase 2 enable | W | |
| Bit 2 | VI interrupt enable | W | |
| Bit 4 | UNICODE interrupt enable | W | |
| Bit 5 | Clear Interrupt flags | W | |
| Bit 6 | Enable Output to line cards after chip reset | W | |
| Bit 7 | SBI B Loop Override | W | |
| Control Register 1 | | | 1A1 |
| Bit 0 | SBI A Loop Override | W | |

TABLE II-continued

| Register Name | | Register Function | LSP Read/Write | Address (HEX) |
|---|---|---|---|---|
| | Bit 1 | UNICODE detect enable | W | |
| | Bit 3 | RAM A low bit access enable | W | |
| | Bit 4 | TX VI sent start | W | |
| | Bit 5 | | W | |
| | Bit 6 | | W | |
| | Bit 7 | TX signal pulse stretch | W | |
| EEPROM Control Registers | | | | |
| | EE0 | D7 mode 0 = LUC, 1 = Extern | W | 1A6 |
| | | D6..D2 Bus Slot Address | W | |
| | | D1..D0 EEPROM Op Code | | |
| | EE1 | EE write data D7..D0 | W | 1A7 |
| | EE2 | EE write data D15..D8 | W | 1A8 |
| | EE3 | D7..D6 read register # | W | 1A9 |
| | | D5..D0 EE address A5..A0 | | |
| VI Send Message Start Pointer | | | W | 1AB |
| VI Send Message End Pointer | | | W | 1AC |
| TSA Alarm Watchdog Control (LCALRM) | | | W | 1AD |
| Test MUX Control Register | | | W | 1AE |
| Page Control Register | | | W | 1AF |
| | Bits 5..4 | RAM A Message page | | |
| | Bits 3..0 | RAM B Access page | | |
| Inter Processor Comm. Register 0 | | | W | 1B0 |
| Inter Processor Comm. Register 1 | | | W | 1B1 |
| A processor Enable (from B processor) | | | W | 1B9 |
| Status Register 0 | | | | 1A0 |
| | Bit 0 | SBI B Parity Error Flag | R | |
| | Bit 1 | SBI B I Bit Flag | R | |
| | Bit 2 | SBI B Loop Status | R | |
| | Bit 3 | SBI B Remote Parity Error | R | |
| | Bit 4 | SBI A Parity Error Flag | R | |
| | Bit 5 | SBI A I bit Flag | R | |
| | Bit 6 | SBI A Loop Status | R | |
| | Bit 7 | SBI A Remote Parity Error | R | |
| Status Register 1 | | | | 1A1 |
| | Bit 0 | FIFO Empty Flag | R | |
| | Bit 1 | FIFO Full Flag | R | |
| | Bit 2 | SBI A In Sync Flag | R | |
| | Bit 3 | SBI B In Sync Flag | R | |
| | Bit 4 | SBI A/B Selected 0 = A | R | |
| | Bit 5 | VI Interrupt Flag | R | |
| | Bit 7 | UNICODE Int. Flag | R | |
| EEPROM Read Register | | | R | 1A2 |
| FIFO Read Register | | | R | 1A4 |
| (pops data off stack until empty) | | | | |
| Inter Processor Comm. Register | | | R | 1B0 |
| Inter Processor Comm. Register | | | R | 1B1 |

Figure 7:
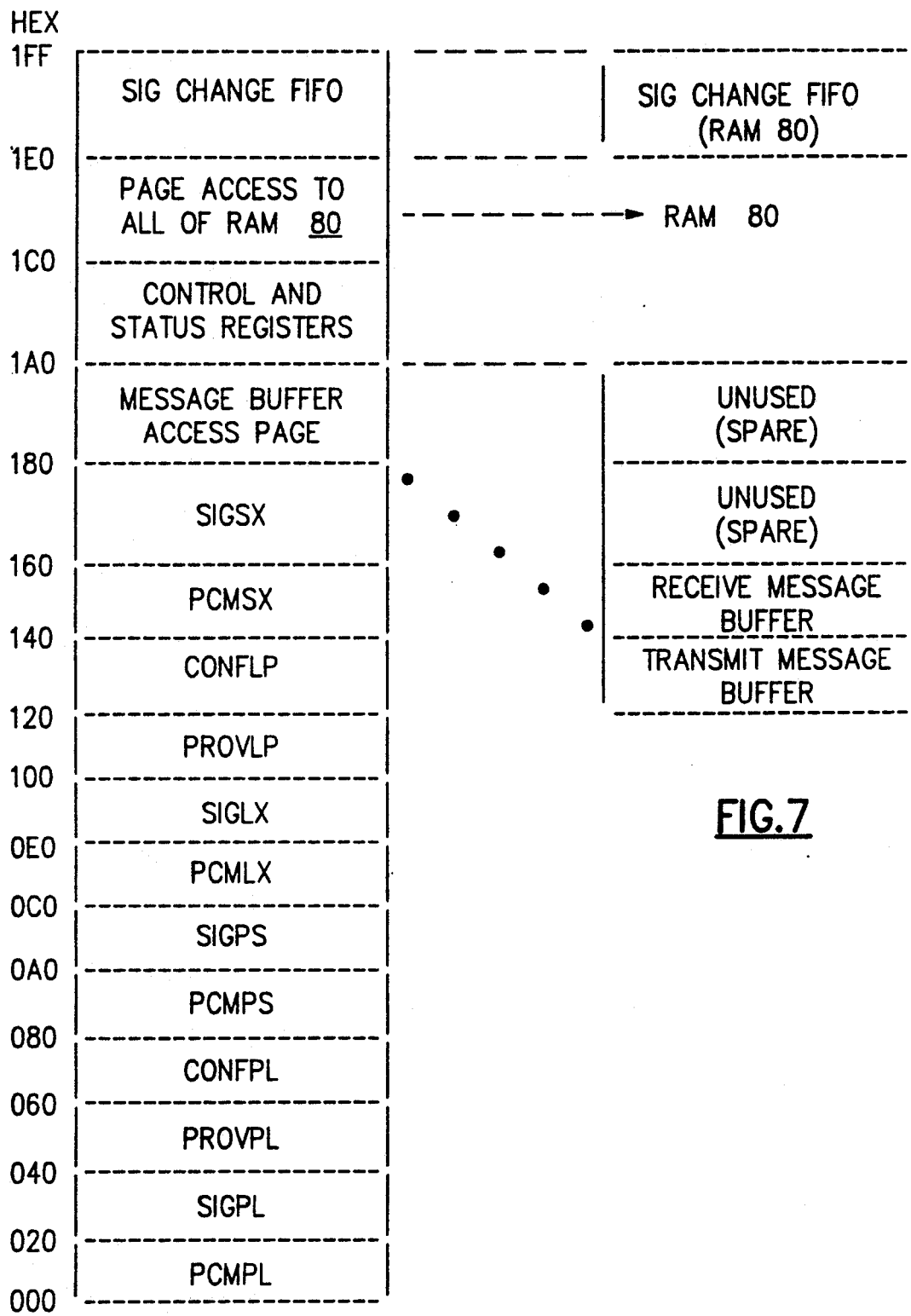
FIG. 7 is a memory map of the TSA as seen from an LSP port.

As seen from the LSP, only 512 data bytes in the TSA are accessible. Thus, access is provided either directly or through paging to RAM 64 or RAM 80 and all control and status registers. FIG. 7 shows the memory map as seen from an LSP interface 82. The first 384 bytes of the map from 000-17F give direct access to the same section of the communications memory in RAM 64. The remaining 128 addresses are divided into four equal sections, as follows:

Message Buffer Access Page at 180-19F. At any one time one of four 32-byte zones in RAM 64 is directly accessible through this 32-byte window. Selection is by writing to the message page control register bits at address 1AF. The four zones are: 180-19F/Transmit Receive Buffer, 1A0-1BF/Receive Message Buffer, 1C0-1DF/Spare, and 1E0-1FF/Spare.

Control and Status Registers at 1A0-18F. All control and status registers are mapped into this area.

RAM 80 Access Page at 1C0-1DF. This forms a window to a 32-byte page in RAM 80. RAM 80 is divided into sixteen 32-byte pages accessible by writing a 4-bit page number to the page control register bits at 1AF.

Signaling FIFO Access Page at 1E0-1FF. This gives direct access to the top 32 bytes of RAM 80 where the FIFO that records changes in signaling states is located.

The TSA can be instructed to generate DMA requests at a frame rate of 8 KHz to the processor. This is useful for the following functions:

1. Blocks of data can be transferred to or from TSA RAM.
2. Serial data can be injected in one channel at a time on any of the system buses. In particular, a sequence of data bytes can be transmitted to the PROR bus to provision any channel card that has programmable codecs or other logic devices requiring setup or control. It is also possible to send a sequence of bytes in any PCM channel to generate a tone or other sound.
3. Serial data can be received from any one channel at a time on any of the system buses. In particular, a sequence of data bytes can be received from the PROT bus to read back provisioning or other information from any channel card that has programmable codecs or other logic devices. It is also possible to receive a series of bytes in any PCM channel and store them for later analysis in a software spectrum analyzer (FFT).

Each TSA can generate two DMA pulses, one (phase 1) at the beginning of a 125 us PCM frame, to the currently enabled processor. The second (phase 2) is generated half-way through a frame, to the currently deselected processor. Phase 1 is used for all general transfers and phase 2 is used only for LSP-LSP DMA transfers.

DMA requests are enabled by setting bits 0 and 1 of control register 0 to generate phase 1 and phase 2 respectively. DMA enabling is delayed to the start of the next new frame so in the case of phases 1 and 2 being turned on together the process always starts with a phase 1 DMA request.

The procedure for initiating a DMA transfer is:
1. The processor initializes its DMA registers with source address offset and segment, destination address offset and segment, transfer count and control word. The control word determines whether source and/or destination pointers are incremented, byte or word, priority and other information. The user can elect to force an interrupt when DMA transfer completes. In this case, an interrupt handler controls item 4 below.
2. The processor enables the DMA circuitry on the LSP by writing to the LSP control register at 1AOH Set bits 3 and 4 at 1AOH.
3. The processor sets bit 0 of control register 0 on the appropriate TSA. DMA requests start. ,
4. When all bytes are transferred, DMA requests should be disabled by resetting bit 0 of control register 9 and bits 3 and 4 of the LSP control register. For a dual processor LSP-LSP transfer:
1. As 1 and 2 above, but initialize the DMA registers on both processors. The selected processor will always receive the first DMA request, so if transfers are to be from deselected to selected processor, one additional count should be allowed for. Choose any TSA register to write/read and use any TSA to generate the DMA requests.
2. Set bits 0 and 1 of TSA control register 0.
3. Reset bits 0 and 1 of TSA control register 0 when transfer completes.

The handling of signaling will now be described. The SBI carries channels with speech and signaling in time slots 3-26. Each time slot carries one of the DS0 channels 1-24 formatted in the following manner:

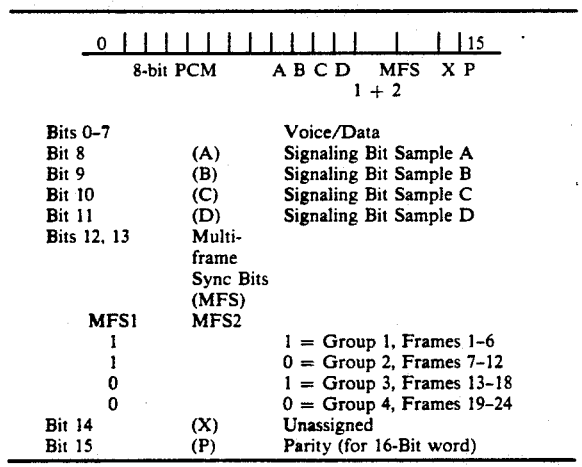

| | | |
|---|---|---|
| 8-bit PCM | A B C D MFS X P | |
| | 1 + 2 | |
| Bits 0-7 | | Voice/Data |
| Bit 8 | (A) | Signaling Bit Sample A |
| Bit 9 | (B) | Signaling Bit Sample B |
| Bit 10 | (C) | Signaling Bit Sample C |
| Bit 11 | (D) | Signaling Bit Sample D |
| Bits 12, 13 | | Multi-frame Sync Bits (MFS) |
| MFS1 | MFS2 | |
| 1 | 1 | 1 = Group 1, Frames 1-6 |
| 1 | 0 | 0 = Group 2, Frames 7-12 |
| 0 | 1 | 1 = Group 3, Frames 13-18 |
| 0 | 0 | 0 = Group 4, Frames 19-24 |
| Bit 14 | (X) | Unassigned |
| Bit 15 | (P) | Parity (for 16-Bit word) |

Bits 8-11 contain the bits from the four signaling highways; and though the bits appear in parallel as a 4-bit word, they are updated in a staggered manner on the receive SBI: A on frame 6, B on frame 12, C on frame 18, and D on frame 24. Bits 12 and 13 identify the frame group of the frame that is being received. The format described above is based on the extended superframe which is composed of 24 frames. Note that the TSA generates all bits at once so the outgoing ABCD is valid at all times.

The TSA receives the previously-described format of signaling regardless of its application, and provides the circuitry necessary to handle the various signaling translations required. The TSA also transmits signaling information to the SBI in the same manner that it is received, except that ABCD information does not change incrementally.

Receive signaling from the SBI is sampled every six frames, and the states of the signaling multiframe count bits (SBI bits 12 and 13) are tested to see if the ABCD state is valid. If so, the TSA signaling logic takes this ABCD state, together with previous state information stored in RAM 80, and determines what action to take. The resulting ABCD state is applied to the translate table and then stored in RAM 64 for delivery to the LU once every frame.

The TSA is designed to operate in either of two modes: one for TR-303, and another for TR-8.

In the TR-303 application of the LU, signaling information on SBI channels 3-26 is received in extended superframe format with four signaling highways A, B, C, D. Some LUs used in a TR-303 DLC may utilize only one (A) or two (A and B) signaling highways rather than all four. Thus, in the case where only one highway is used, the TSA treats the B, C and D signals as A signals. In the case where two highways are used, the TSA treats the C and D signals as A and B signals, respectively. The TSA is programmable for all of these cases on a per channel basis by setting the appropriate bits in the connect memory section of RAM 80, according to the following formula:

| Connect Bits | | Signal Type | Update every |
|---|---|---|---|
| 0 | 0 | A | 6 frames (.75 mS) |
| 0 | 1 | AB | 12 frames (1.5 mS) |
| 1 | 0 | ABCD | 24 frames (3.0 mS) |
| 1 | 1 | Straight Thru | 1 frame (125 uS) |

Circuitry on the TSA processes the signaling information in the following manner:

Receive Signaling

At the beginning of each time slot the TSA reads the connect memory location for the receive channel which is to be processed. From this it knows whether the channel is a 1, 2 or 4 signaling highway type channel (A, AB or ABCD type signaling).

The TSA monitors the multiframe sync bits (bits 12 and 13). This information determines which signaling bit has been most recently updated. When the code indicates that a complete signaling bit set is present (1, 2 or 4 bits as specified by the connect memory), then the data is captured and passed as an address to the receive signaling translate table in RAM 80. The converted signaling is then stored in the appropriate location in the communications memory of RAM 64 where it is scanned every frame, serialized and transmitted to the LU.

The last three complete received untranslated ABCD states are also stored in RAM 80 for use in UNICODE and FIFO update determination.

In the event of UNICODE being detected (Bit 1 of control register 1 at 1A1 must be set to enable this), shifting of ABCD nibbles is frozen, and the signaling state is taken from ABCD-3 until UNICODE goes away for four consecutive ABCD frames.

Transmit Signaling

At the beginning of each time slot, the TSA reads the connect memory location for the transmit channel which is to be processed. From this it knows whether the channel is a 1, 2 or 4 signaling highway type channel (A, AB or ABCD type signaling).

Transmit signaling from the LUs is sampled every six frames, and the state of the TSA transmit multiframe counter is tested to determine if the transmit signaling should be updated. The decision is based on signaling type and the state of the transmit multiframe counter.

The previous four bits of signaling data from the line cards is stored in RAM 80 at addresses 1C8-1DF, together with a 4-bit hit timer for the off-hook bit A. The previous code is applied to the transmit look-up table for that channel and loaded with the multiframe counter bits into RAM 64 SIGLX memory.

If the logic determines that the transmit signaling should be updated, then new bits from the LU are stored in RAM 80, causing the translated data in RAM 64 to take a new state six frames later. The off-hook bit (bit 7) from the line card is tested by hit timer logic before it is updated. The hit timer is set to time out at 15 ms to remove glitches on dial pulsing. The timer can be disabled by setting the hit timer state to all 1 s by overwriting the contents of RAM 80 bits 0-3 at the correct address. Note that since the TSA reads and rewrites data at these addresses, the LSP must read the data back to verify that the state has been correctly written.

An option is provided to stretch dial pulse on-hook time by 6 ms. This is done by making the hit timeout on hook time 21 ms and the off hook 15 ms. This can only be set on a 24-channel basis by setting bit 7 of control register 1 at 1A1.

In TR-8 applications of the LU for both metallic and optical spans, signaling translation is more complex than in the TR-303 case. Signaling information on SBI channels is received as if it had arrived in extended superframe format with four signaling highways A, B, C and D, except that C and D are really the next A and B states. Each A or B bit can assume one of three states: one, zero, and toggling between one and zero.

Circuitry in the TSA processes the TR-8 signaling information in the following manner:

Receive Direction

Every 24 frames a new valid ABCD signaling state is received. This is sampled and stored for future use. RAM 80 stores the last two complete ABCD signaling states received. At the beginning of each time slot, this data is read out into registers, shifted four bits if a new ABCD has arrived, combined with the new data, and restored. Before shifting and restoring, the current four and previous eight bits are held in registers for use in determining the current signaling state thus:

| A0 | B0 | A1 | B1 | A2 | B2 | A3 | B3 | A4 | B4 | A5 | B5 |
|----|----|----|----|----|----|----|----|----|----|----|----|
| a  | b  | c  | d  | a  | b  | c  | d  | a  | b  | c  | d  |

The A data A0-A5 is separated from the B data B0-B5 and each is applied to a look-up table to make the best determination of the state of each bit, whether it is 0, 1 or toggle. The results for A and B are recombined to form a 4-bit code having the following format:

| 4-bit code: | A | AT | B | BT |
|---|---|---|---|---|

A = Last A signal received.
AT = Signal to indicate A signal is toggling.
B = Last B signal received.
BT = Signal to indicate B signal is toggling This code is applied, as an address, to the receive translate table in RAM 80 and the result loaded into the receive signaling data section of RAM 64 for scanning and delivery to LUs.

TR-8 Translation Logic

Table 3 shows the logic that converts each of the A and B bit histories into 0, 1 or toggle form. In the table I0 .. I5 represents the last six bits received (A or B). O represents the output state 0 or 1, and a 1 in the Otog column indicates the toggling state. If the bit is toggling, then the 0 bit is shown as 'don't care' (x). The translate tables must convert either state to the same result.

TABLE III

| | A/B Data | | | | | | Result | |
|---|---|---|---|---|---|---|---|---|
| | Latest | | | | Oldest | | | |
| | I0 | I1 | I2 | I3 | I4 | I5 | O | Otog |
| 00 | 0 | 0 | 0 | 0 | 0 | 0 | 0 | 0 |
| 01 | 0 | 0 | 0 | 0 | 0 | 1 | 0 | 0 |
| 02 | 0 | 0 | 0 | 0 | 1 | 0 | 0 | 0 |
| 03 | 0 | 0 | 0 | 0 | 1 | 1 | 0 | 0 |
| 04 | 0 | 0 | 0 | 1 | 0 | 0 | 0 | 0 |
| 05 | 0 | 0 | 0 | 1 | 0 | 1 | x | 1 |
| 06 | 0 | 0 | 0 | 1 | 1 | 0 | 0 | 0 |
| 07 | 0 | 0 | 0 | 1 | 1 | 1 | 0 | 0 |
| 08 | 0 | 0 | 1 | 0 | 0 | 0 | 0 | 0 |
| 09 | 0 | 0 | 1 | 0 | 0 | 1 | 0 | 0 |
| 10 | 0 | 0 | 1 | 0 | 1 | 0 | x | 1 |
| 11 | 0 | 0 | 1 | 0 | 1 | 1 | 0 | 0 |
| 12 | 0 | 0 | 1 | 1 | 0 | 0 | 0 | 0 |
| 13 | 0 | 0 | 1 | 1 | 0 | 1 | 0 | 0 |
| 14 | 0 | 0 | 1 | 1 | 1 | 0 | 0 | 0 |
| 15 | 0 | 0 | 1 | 1 | 1 | 1 | 1 | 0 |
| 16 | 0 | 1 | 0 | 0 | 0 | 0 | 0 | 0 |
| 17 | 0 | 1 | 0 | 0 | 0 | 1 | x | 1 |
| 18 | 0 | 1 | 0 | 0 | 1 | 0 | 0 | 0 |
| 19 | 0 | 1 | 0 | 0 | 1 | 1 | 0 | 0 |
| 20 | 0 | 1 | 0 | 1 | 0 | 0 | x | 1 |
| 21 | 0 | 1 | 0 | 1 | 0 | 1 | x | 1 |
| 22 | 0 | 1 | 0 | 1 | 1 | 0 | 0 | 0 |
| 23 | 0 | 1 | 0 | 1 | 1 | 1 | x | 1 |
| 24 | 0 | 1 | 1 | 0 | 0 | 0 | 1 | 0 |
| 25 | 0 | 1 | 1 | 0 | 0 | 1 | 1 | 0 |
| 26 | 0 | 1 | 1 | 0 | 1 | 0 | 1 | 0 |
| 27 | 0 | 1 | 1 | 0 | 1 | 1 | 1 | 0 |
| 28 | 0 | 1 | 1 | 1 | 0 | 0 | 1 | 0 |
| 29 | 0 | 1 | 1 | 1 | 0 | 1 | x | 1 |
| 30 | 0 | 1 | 1 | 1 | 1 | 0 | 1 | 0 |
| 31 | 0 | 1 | 1 | 1 | 1 | 1 | 1 | 0 |
| 32 | 1 | 0 | 0 | 0 | 0 | 0 | 0 | 0 |
| 33 | 1 | 0 | 0 | 0 | 0 | 1 | 0 | 0 |
| 34 | 1 | 0 | 0 | 0 | 1 | 0 | x | 1 |
| 35 | 1 | 0 | 0 | 0 | 1 | 1 | 0 | 0 |
| 36 | 1 | 0 | 0 | 1 | 0 | 0 | 0 | 0 |
| 37 | 1 | 0 | 0 | 1 | 0 | 1 | 0 | 0 |
| 38 | 1 | 0 | 0 | 1 | 1 | 0 | 0 | 0 |
| 39 | 1 | 0 | 0 | 1 | 1 | 1 | 1 | 0 |
| 40 | 1 | 0 | 1 | 0 | 0 | 0 | x | 1 |
| 41 | 1 | 0 | 1 | 0 | 0 | 1 | 1 | 0 |
| 42 | 1 | 0 | 1 | 0 | 1 | 0 | x | 1 |
| 43 | 1 | 0 | 1 | 0 | 1 | 1 | x | 1 |
| 44 | 1 | 0 | 1 | 1 | 0 | 0 | 1 | 0 |
| 45 | 1 | 0 | 1 | 1 | 0 | 1 | 1 | 0 |
| 46 | 1 | 0 | 1 | 1 | 1 | 0 | x | 1 |
| 47 | 1 | 0 | 1 | 1 | 1 | 1 | 1 | 0 |
| 48 | 1 | 1 | 0 | 0 | 0 | 0 | 0 | 0 |

TABLE III-continued

| | A/B Data | | | | | Result | |
|---|---|---|---|---|---|---|---|
| Latest | | | | | Oldest | | |
| I0 | I1 | I2 | I3 | I4 | I5 | O | Otog |
| 49 | 1 | 1 | 0 | 0 | 0 | 1 | 1 | 0 |
| 50 | 1 | 1 | 0 | 0 | 1 | 0 | 1 | 0 |
| 51 | 1 | 1 | 0 | 0 | 1 | 1 | 1 | 0 |
| 52 | 1 | 1 | 0 | 1 | 0 | 0 | 1 | 0 |
| 53 | 1 | 1 | 0 | 1 | 0 | 1 | x | 1 |
| 54 | 1 | 1 | 0 | 1 | 1 | 0 | 1 | 0 |
| 55 | 1 | 1 | 0 | 1 | 1 | 1 | 1 | 0 |
| 56 | 1 | 1 | 1 | 0 | 0 | 0 | 1 | 0 |
| 57 | 1 | 1 | 1 | 0 | 0 | 1 | 1 | 0 |
| 58 | 1 | 1 | 1 | 0 | 1 | 0 | x | 1 |
| 59 | 1 | 1 | 1 | 0 | 1 | 1 | 1 | 0 |
| 60 | 1 | 1 | 1 | 1 | 0 | 0 | 1 | 0 |
| 61 | 1 | 1 | 1 | 1 | 0 | 1 | 1 | 0 |
| 62 | 1 | 1 | 1 | 1 | 1 | 0 | 1 | 0 |
| 63 | 1 | 1 | 1 | 1 | 1 | 1 | 1 | 0 |

Transmit Direction

The transmission of signaling information to the SBI is treated exactly the same as in TR-303 four highway signaling. TX data in the signaling highway from the LUs is sampled once every 24 frames. Only four bits from the LU detectors are used. These are applied as an address to the transmit signaling translate table. The table must be programmed so that data is converted to a toggling form where needed. This may be accomplished in the following manner:

| State: | Not Toggling | Toggling |
|---|---|---|
| A bit | C = A | C = $\overline{A}$ |
| B bit | D = B | D = $\overline{B}$ |

The actual coding LU to SBI and decoding SBI to LU of the signaling information is performed in RAM 80 using the two 384×4 look-up tables. The look-up tables are programmed by the LSP using data obtained from the EEPROMs on the LUs for each channel.

Signaling information received from the SBI is combined with the channel number 1-24 to form an address to the receive look-up table. The data at this address is the decoded signaling information which is then stored in the communications RAM of RAM 64 for transmittal to the LUs across the signaling line of the line unit bus 40.

In the transmit direction, signaling data from the LU detectors is combined with the channel number to form an address to the transmit look-up table. The data at this address is the coded signaling information which is loaded into the communications RAM and then sent to the SBI.

Note that in both cases, this particular design accommodates outputs from only four LU detectors, and only four LU relays can be controlled by the decoded information. This limitation was specified to limit the amount of the memory required by the translation tables. Any LU requiring more than four outputs or controls must provide its own hardware to perform the additional coding and decoding necessary. This extra hardware should only be required by special low-volume LUs.

Independent of the translated receive signaling, the LSP can write to the unused four signaling bits that are sent to LUs. This can be used to activate test relays, etc.

The look-up tables allow the signaling translation to occur without involving the LSP. However, there are some instances where LSP intervention is desired (e.g., when a signaling state changes). For this reason, circuitry within the TSA checks a control bit in the connect memory to determine whether LSP processing of the information is required. If the information requires analysis, the circuitry does a comparison of the present and previous signals, identifying changes in the signaling. The locations of any changes in signaling are pushed into a FIFO buffer where then can be read by the LSP. Inter-module communications provide the capability of transferring information to and from modules outside of the line cluster. Communication is via messages inserted in time slot 31 of the SBI using VI protocol, described in the afore-mentioned U.S. Patent application Ser. No. 349,716. The VI channel data format accepted and transmitted by the TSA is:

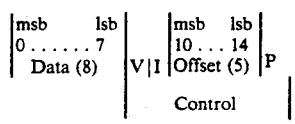

Data field (bits 0-7)—These eight bits constitute the actual message byte transmitted.

V (bit 8)—The 'valid' bit indicates that the data byte contains valid data. Active low.

I (bit 9)—the 'interrupt' bit indicates that the end of a message has been received. Active low.

Offset field (bits 10-14—These five bits are normally used as a count (when V is active) and are typically incremented every frame. This information is used to sort the message.

Also, the use of only five bits limits the message size to 32 bytes.

P (bit 15)—The 'parity' bit which forces odd parity on the 16-bit word and is used as a means of error detection.

If no inter-module messages are being transmitted, an idle code shall occupy the channel.

Communications messages are delivered to and from the LSP via LSP bus 48 and the LSP interface 82. Transfer of messages between the LSP and the SBI is handled on the TSA by two 32-byte message buffers in RAM 64, and message pointer and counter registers.

The circuitry in the TSA which transmits messages from the LUs to the SBI includes the following for the active (selected) SBI: a send message end pointer register, a send message start pointer register, a transmit start control circuit, and a 32-byte TX message buffer.

The message transmit process is outlined below:

1. The message to be sent from the LSP toward the SBI is stored in the 32-byte transmit buffer in RAM 64.
2. The LSP loads the send message end pointer register with the value (0-31) pointing to the last byte to be sent. The LSP also loads the send message start pointer register with a value (0-31) pointing at the first byte in the transmit buffer that must be sent.
3. The LSP starts the transmission of data from the TSA's TX buffer to the SBI by setting and resetting the send enable control bit 4 of control register 1 at 1A1. At each time slot 31, the TSA assembles an outgoing word consisting of:

Bits 0-7 the data pointed to by the offset counter.
Bit 8 the V bit is set to a 0 (0=valid).
Bits 9-14 the 5-bit value in the offset counter.
Bit 15 the parity bit.

4. When the entire message has been transmitted (when the send message pointer register equals send message end pointer register) the TSA sets the I bit low on the last outgoing word. On subsequent frames it reverts to sending idle code.

The circuitry used to receive messages from the SBI includes a control information (bits 8-15) decoding circuit and a 32-byte RX message buffer. The receive process is outlined below:

1. A message is sent to the LU across the SBI.
2. Circuitry on the TSA analyzes the control information—checking the valid, interrupt and parity bits.
3. If the valid bit is set (low), the circuitry uses the offset bits to address a location in the TSA's RX buffer where it then stores the data byte.
4. If both the valid and the interrupt (end of message) bits are low (i.e., active), an interrupt to the LSP will be generated by the TSA provided the interrupt is enabled.
5. The LSP can then transfer the message from the TSA's RX buffer to its own RAM using a DMA.

A latched flip-flop in the TSA is used to disable outputs to the LUs when it is in the reset state. This means that outputs PCMR, SIGR, PROR and CONR will be held low. A low input on reset input 56 asynchronously forces this latch into the reset state. The latch can only be set by writing to bit 6 in control register 0. This prevents any unwanted signals from being sent to the LUs until the LSP is satisfied that everything in the TSA has been set up correctly. Power on reset also sets the frame sync state machines to state A, the SBI select to SBI A and the LSP arbitration logic to the initial A and B OK state. Before enabling transmission the LSP must initialize CONR, CONNECT and SIGPL memory to ensure that channels come up in a quiescent, non-ringing state.

An output alarm 58 is provided on the TSA to enable a card alarm LED in the event of the failure of any part of the LSA. The output pin is pulsed by writing to address 1AD (data =don't care). This output in turn drives an external watchdog circuit. If this is not refreshed within approximately 100 ms, then an alarm will be indicated by lighting the LED. This circuit is duplicated for the second TSA. The failure of either will light the LED.

When an EEPROM 50 is activated by signals from the TSA, the EEPROM data is read out serially at 256 Kilobits/sec. on the system backplane buses. EEPROMs are activated either by a direct strobe from the TSA or via a bit sent over the CONR line of line unit bus 40 to a LUC 42 which, in turn, generates the strobe. EEPROMs on the LSA and power supplies use direct strobes, while those on channel cards are controlled through LUCs.

The TSA controls the EEPROM sequencing automatically. All that is needed is to write to the appropriate registers. On completion of the last register write, the TSA automatically initiates the sequence, setting the appropriate strobe or activating the correct bit on the CONR line which, in turn, will cause the correct LUC to generate an EEPROM strobe. The EEBUSY bit 7 of register at 1A3 is set while transfer is proceeding.

The TSA logic is designed around a 64-word by 16-bit EEPROM of the 9346 type. This device accepts a 2-bit opcode followed by a 6-bit address and 16 bits of data. The TSA controls this through the following four write-only registers:

| 1A6 | EE0 | Mode (D7), CONR Line Slot (D6-D2), Op-Code (D1-D0) or: Mode (D7), Strobe Enable (D3-D2), Op-Code (D1-D0) |
| 1A7 | EE1 | Low data byte for writing to EEPROM |
| 1A8 | EE2 | High data byte for writing to EEPROM |
| 1A9 | EE3 | Read select D7-D6, EEPROM address D5-D0 |

To read an EEPROM, the LSP must write to EE0 and then EE3. To write, the LSP must write to EE0, EE1, EE2, EE3 in that order. The mode bit D7 of EE0 selects whether the EEPROM is on a LU (D7 =0) or if the EEPROM is activated directly from the TSA (D7 =1).

In the register EE0, if mode bit (D7) =0, then a CONR line slot number must be specified in EE0 bits D6-D2. This corresponds to the slot that will send the ID for the LUC on the CONR line. For instance, if a LUC is in slot 7 of the right-hand half of the line shelf and we want its data to appear in SBI time slot 13 (speech channel number 9), we must program the CONR section of RAM 64 with a Hex17 at memory location 06B. The Hex17 will be sent in time slot 11 (2 time slots earlier than 13 to satisfy the LUC). Slot 11 is the CONR slot that must be programmed in bits D6-D2 of EE0. The TSA will automatically set bit 6 of CONR slot 11 for one frame to activate the correct LUC and hence strobe the correct EEPROM.

In register EE0, if mode bit (D7) =1, then bit D2 must be set to a 1 to select external EEPROM strobe EECS0, or bit 3 for EECS1. In this case, bits D4–D6 are not used.

If the LSP is writing to an EEPROM (only permitted for EEPROM addresses Hex20 to 3F, inhibited by the TSA for addresses 00 to 1F), then registers EE1 and EE2 must be written to with appropriate data.

Finally, register EE3 must be written to with a 6-bit EEPROM address D5 to D0 and two optional control bits D7 to D7. As soon as EE3 is written, the EEPROM cycle is started, taking two to three frames to complete. At the end of this time, when the EEBUSY bit goes low, the data can be read from the EEPROM read register at 1A2. This will contain data dependent on the bits D6-D7 of EE3 that were written previously.

The EEPROM logic read/write cycle is as follows: When the LSP completes writing to the last register, the request is locked in and the TSA waits for the next occurrence of the designated CONR line time slot. The TSA sets the correct bit in the slot and this is passed to the LUC on the approximate LU. The LUC waits for the start of the next frame as defined by the TSA transmitting on offset byte in time slot 30 and generates an EEPROM enable strobe starting in time slot 2 and completing at the end of time slot 31. At the same time the TSA shifts serial data towards the EEPROM starting in time slot 7 and, in the case of a write, completing in time slot 31. If a read is requested, the EEPROM sends data back tot he TSA, where it can be read in the register at 1A2.

| D7 | D6 | Function of EEPROM register at 1A2 |
|----|----|-----------------------------------|
| 0  | 0  | EEPROM LS data byte in TSA |
| 0  | 1  | EEPROM MS data byte in TSA |
| 1  | 0  | EEPROM address byte register in TSA |
| 1  | 1  | Not used |

-continued

EEPROM Op Codes are as follows:

| Instruction | Op-Code D1-D0 of EE0 | Address D1-D0 of EE3 | Comments |
|---|---|---|---|
| READ | 1 0 | A5A4A3A2A1A0 | |
| WRITE | 0 1 | A5A4A3A2A1A0 | A5 = 1 |
| ERASE | 1 1 | A5A4A3A2A1A0 | A5 = 1 |
| EWEN | 0 0 | 1 1 x x x x | Erase/Write Enable |
| EWDS | 0 0 | 0 0 x x x x | Erase/Write Disable |
| ERAL | 0 0 | 1 0 x x x x | Erase all* |
| WRAL | 0 0 | 0 1 x x x x | Write all* |

*Erase all and Write all instructions are prohibited by the TSA EEPROM control logic.

The EEPROM must be write-enabled before writing or erasing. For security it should be write-disabled afterwards. A memory location must be erased (set to all 1s) before it can be written. Writing or erasing takes 10 ms maximum. While the EEPROM is busy, a read will return data as all 0 s. A pull-up should be included on the EEPROM bus line to make the data to be all 1 s if no EEPROM is present.

The LSP scans all slots in the line shelf by periodically sending all slot ID codes sequentially on the CONR line of the line unit interface bus 40, along with a one-bit EEPROM read request. These signals are processed by the LUC 42 in the various LUs to generate a strobe to the EEPROM of the LU. The EEPROM responds appropriately to the request.

When a new LU is plugged in, it receives the LSP scan and the EEPROM responds, telling the LSP of the LU's presence. The LSP can then initialize the LU, read the signaling translation information from the EEPROM and write it to RAM 80 at an address corresponding to the slot ID code.

The LSP can then assign one or more time slots to the LU by writing the ID code of the LU into one or more bytes of the CONFPL block of RAM 64 as configuration data. If the LU's ID code is written to one byte, the time slot represented by that byte will be assigned to the LU. If the ID code is written to several adjacent bytes, the LU will have the benefit of a wider bandwidth represented by a plurality of time slots. Thus, the LU can be assigned to any one or more time slots.

The CONR line of the line unit interface bus 40 sequentially sends out the 32 bytes of configuration data stored in block CONFPL of RAM 64. Each LU is activated when it recognizes its ID code on the CONR line.

Thus, the present invention provides an interface between an SBI, a line unit bus and an LSP. Through the unique structure of the present invention, the LSP is provided with direct access to the information contained within the time slots. Information may be speech, signaling and other control data, thereby providing the LSP with heretofore unavailable control possibilities. By having direct access to the signaling bits in the time slots, the bits can be translated to accommodate various signaling schemes without real time intervention by the LSP. The TSA provides for time slot assignment, which may be programmably controlled to assign any particular time slot to a LU, or a plurality of time slots to a single LU to provide broad band capability.

What is claimed is:

1. Apparatus for use in a time division multiplexed communications system terminal of the type which information to and from a plurality of subscriber line units is inserted into and extracted from time slots of a time division multiplexed bidirectional bus, said apparatus comprising:
   lie unit interface means for receiving and transmitting information from and to said line units;
   time division multiplexed bus interface means for extracting and inserting information from and into time slots on said time division multiplexed bus;
   memory means for storing information, said memory means connected to said line unit interface means and said time division multiplexed bus interface means;
   processor means connected to said memory means, said line unit interface means and said time division multiplexed interface means for communicating with all three said means; and
   read/write means associated with said memory means and under control of said processor means for writing information received from said line units and said time division multiplexed bus into said memory means and for reading information from said memory means and sending it to said line unit interface means and time division multiplexed bus interface means for delivering said information to said line units and insertion into time slots of said time division multiplexed bus, whereby information is temporarily stored in said memory and is accessible to and modifiable by said processor means, which controls the read/write means to read information from the memory during selected time slots for insertion into the selected time slots.

2. An apparatus as described in claim 1, wherein the time slots of said time division multiplexed bus are cyclically repeated in frames containing a predetermined number of time slots, and said memory means stores information for each time slot in a frame.

3. An apparatus as described in claim 2, wherein information in the time slots includes speech data, control data and signaling data, and said apparatus additionally includes means to separate said types of data and store the types of data in different blocks of said memory means, whereby the processor has access to each type of data.

4. An apparatus as described in claim 3, wherein different signaling data schemes are used for the various line units and for the telecommunications system, said apparatus additionally comprising:
   signaling translation tables stored in said memory means; and
   means for applying signaling data to said translation tables to translate said signaling from one scheme to another prior to its being stored in said memory means.

5. An apparatus as described in claim 4, wherein the signaling translation tables include a first table to translate signaling used in a line unit to signaling used on the time division multiplexed bus and a second table to translate signaling used on the time division multiplexed bus to signaling used in the various line units, said means for applying signaling data to said translation tables applying signaling from said line units to said first translation table and signaling from said time division multiplexed bus to said second table.

6. An apparatus as described in claim 4, wherein signaling translation tables for the signaling scheme used in a line unit are stored in each line unit, said apparatus additionally comprising:

means for connecting said line unit storage means to said memory means, said means being responsive to commands from said processor means to download the signaling translation tables from the storage in each line unit to the memory means of said apparatus.

7. An apparatus as described in claim 1, wherein each line unit has an assigned identification code, and the information provided to the line units includes identification codes, each line unit being activated when its identification is received, said processor means inserting selected identification codes into information being sent to said line units, so that the processor means may selectively activate line units.

8. An apparatus as described in claim 7, wherein said memory means includes a block of storage for storing an identification code for each time slot, said identification codes being written to said memory unit by said processor means, said information being provided to said line units, including said identification codes, and being provided in the sequence according to the time slots.

9. An apparatus as described in claim 7, additionally comprising a bus connected between the line unit interface means and the line units, so that the identification codes are provided to the line units sequentially on said bus.

* * * * *

UNITED STATES PATENT AND TRADEMARK OFFICE
CERTIFICATE OF CORRECTION

PATENT NO. :  5,088,089
DATED      :  February 11, 1992
INVENTOR(S):  Michael J. Gingell and Joseph E. Sutherland It is certified that error appears in the above-identified patent and that said Letters Patent is hereby corrected as shown below:

```
Col. 26, line 3, "lie" should be --line--;
Col. 25, line 66, "which" should be --wherein--.
```

Signed and Sealed this

Eighteenth Day of May, 1993

Attest:

MICHAEL K. KIRK

*Attesting Officer*    *Acting Commissioner of Patents and Trademarks*